March 9, 1937. R. W. SIMPSON Re. 20,289

FLOWER EXHIBITING DEVICE

Original Filed Oct. 22, 1935

INVENTOR
Robert W. Simpson
BY
Frederick W. Parker
ATTORNEY

Reissued Mar. 9, 1937 Re. 20,289

UNITED STATES PATENT OFFICE 20,289

FLOWER EXHIBITING DEVICE

Robert W. Simpson, New York, N. Y.

Original No. 2,046,854, dated July 7, 1936, Serial No. 46,129, October 22, 1935. Application for reissue November 11, 1936, Serial No. 110,318

14 Claims. (Cl. 47—41)

This invention relates to apparatus for containing and exhibiting flowers and the like, and my improvement is directed to the use of an inverted glass bowl, adapted to be completely filled with water that is sealed therein, together with means for engaging the stems of the flowers which are thus enabled to stand upright within the bowl.

The water in the bowl serves to support the flower petals in their natural extended position for a longer period than otherwise, and further to provide the visual effect of enlargement.

Other features and advantages of my invention will hereinafter appear.

In the drawing:—

Figure 1:
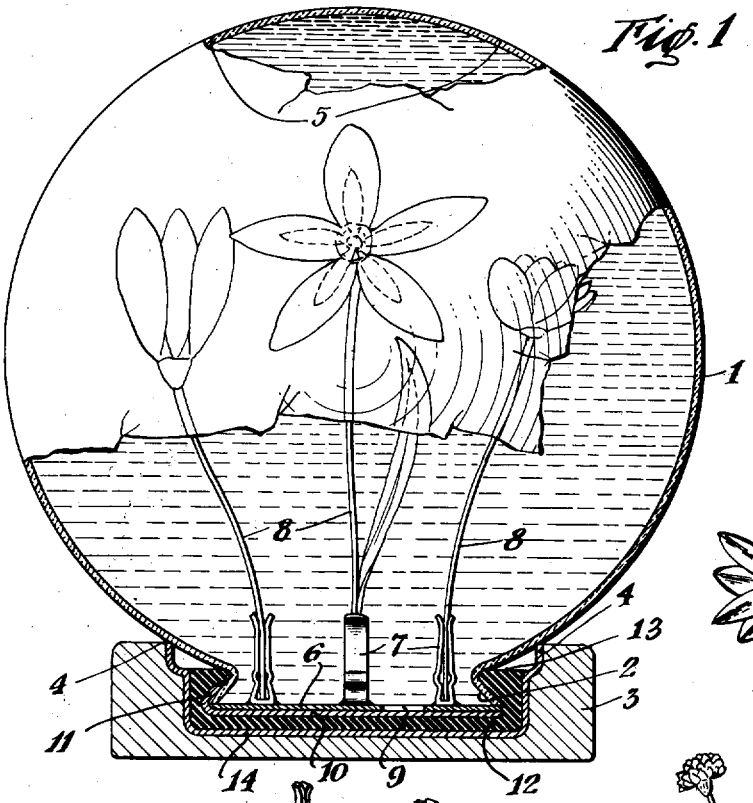
Figure 1 is a sectional elevation of my improved flower exhibiting bowl.

A bowl that is entirely filled with water, provided with a covering sheet or disk for its open end, will as is well known, when inverted, hold its contents under the influence of atmospheric pressure.

It is this principle I rely upon in carrying out my invention.

Thus I provide a bowl 1 composed of glass, and having an outwardly flared neck portion 2. This bowl is to be seated in a suitable support with its neck portion 2 uppermost, and then filled with water.

As a suitable support I may employ the stand which is used with the bowl in its inverted, exhibition position. This stand, which consists of a block 3, is hollowed out as indicated and is adapted, at its inner perimeter 4, to support the bowl at its base 5 for the water filling operation. While thus supported the disk 6 is placed coveringly over the neck portion.

This disk carries, secured thereto, the spring clips 7, in which the stems 8 of flowers are to be inserted and gripped.

The flowers are then placed in the water within the bowl, being held fast to disk 6 by the tensional grip of clips 7 upon their stems.

While the bowl is supported on the stand as stated water is poured through hole 9 in disk 6 to supply any deficiency and assure the exclusion of air.

The next step is to bind disk 6 to neck 2 which is done by sliding a plate 10 over said disk, said plate having a turned over flange 11 that engages the flared neck 2, said plate 10 covering hole 9 in disk 6 and holding said disk in its adjusted position.

Finally a cup-shaped member 12, composed of soft elastic rubber, having an inturned flange 13, is stretched and caused to fit tightly over plate 10 and the bowl neck portion 2, to constitute a permanent seal for the bowl contents.

The bowl is then removed from its filling attitude in the stand, inverted and fitted in a metal cup 14 that forms a lining for the hollowed out portion of the stand, for exhibition purposes, exposing the flowers to view as indicated in Fig. 1.

As an example of magnification the natural size of the flowers is indicated in dotted lines in Fig. 1 and in full lines as magnified in the water.

Figure 4:
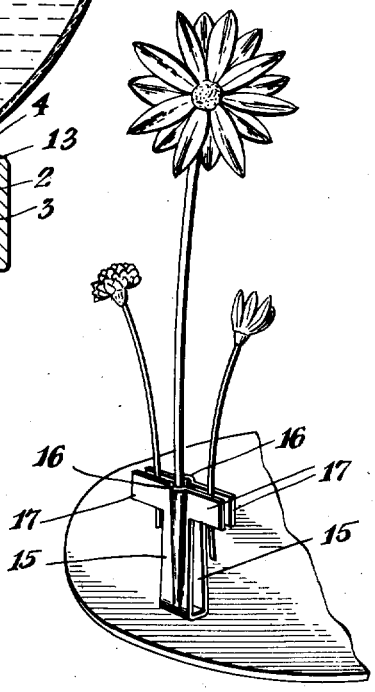
Fig. 4 is a perspective detail of a flower stem carrying plate, having modified stem engaging means.
Figure 2:
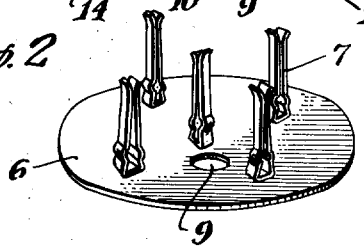
Fig. 2 is a perspective detail of the plate carrying the flower stem engaging means.
Figure 3:
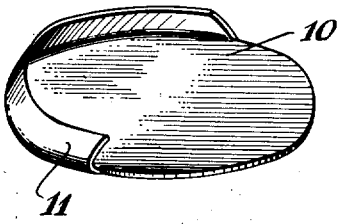
Fig. 3 is a perspective detail of the base securing plate.

In the modified form of clip for the stems of the exhibited flowers, see Fig. 4, such clip is composed of the folded arms 15, of spring metal, having the opposed semi-circular grooves 16, which combine to form a retaining socket for a stem, said arms having transverse opposed extensions 17 adapted to grip between them flower stems of smaller size, to thus enable the exhibition of artistic sprays of large and smaller flowers from a single holder.

Variations within the spirit and scope of my invention are equally comprehended by the foregoing disclosure. For example, in the form of my invention shown in the accompanying drawing, the bowl is provided with a depending flange 2 which is outwardly flared: it will be understood that the portion of the bowl adjacent the opening therein may, however, be provided with any form of flange or flange-like structure that is suitable so to cooperate with a closure member that the liquid contents of the bowl will be retained therein, as described above, under the influence of atmospheric pressure.

I claim:—

1. A device for containing and exhibiting flowers comprising a water filled inverted glass bowl having an outwardly flared neck, a disk to close said neck, a flower stem engaging spring clip secured to said disk, a binding plate to cover said disk, said plate having an inturned flange to engage said flared neck, and a cup-shaped member composed of soft elastic rubber stretched over said plate and flared neck.

2. The subject matter of claim 1 characterized by the provision of a hole in the neck closing disk for the introduction of bowl filling water.

3. The subject matter of claim 1 characterized by the provision of a hollowed out block to support the bowl upturned for water filling and to receive its rubber sealed neck for support when inverted, together with a metal cup lining for said hollowed out block.

4. A supporting clip for the stems of flowers comprising a doubled strip of spring metal whose opposed faces are grooved to form a stem receiving spring clamping socket, the members of said doubled strip having opposed transverse extensions adapted to clamp between them smaller flower stems.

5. A device for containing and exhibiting an article comprising a water filled inverted glass bowl having an outwardly flared neck, a disk to close said neck, means secured to said disk for engaging the article to be exhibited, and a cup-shaped member composed of soft elastic rubber stretched over said disk and flared neck.

6. A device for containing and exhibiting an article comprising a water filled transparent container having an opening at the bottom thereof and being elsewhere closed to the atmosphere; a closure member, in the form of a plate, for said opening and carrying means for engaging the article to be exhibited; and a cup-shaped member composed of soft elastic rubber stretched over said closure member and the bottom of said container adjacent said opening.

7. A device for containing and exhibiting flowers comprising a water filled transparent container having an opening at the bottom thereof and a depending flange, a disk-shaped closure for said opening, a supporting base member provided with an upstanding flange surrounding said depending flange, and means within said opening for engaging flower stems.

8. A device for containing and exhibiting flowers comprising a water filled transparent container having a circular opening at the bottom thereof and an outwardly flared depending annular flange, a disk-shaped member to close said opening, a cup-shaped member engaging said flange and said disk-shaped member, and means within said opening for engaging flower stems.

9. A device for containing and exhibiting flowers comprising a water filled inverted glass bowl having a circular opening therein, a flange in the form of the frustum of a cone depending from the rim of said opening, a closure member therefor provided with a flange extending over the flanged portion of the bowl, and flower stem engaging means associated therewith.

10. A device for containing and exhibiting an article comprising a water filled transparent container having an opening at the bottom thereof and being elsewhere closed to the atmosphere, the bottom of said container being provided with a depending portion having a smooth outside surface, a supporting base member therefor provided with an upstanding portion surrounding and overlapping the depending portion of said container, and means within said opening for engaging the article.

11. The subject matter of claim 10 characterized by the provision of a disk-shaped closure for the opening in said container.

12. A device for containing and exhibiting an article comprising a water filled transparent container having an opening at the bottom thereof and a depending flange which is of uniform height and has a smooth outside surface; a closure member, in the form of a plate, for said opening; a supporting base member provided with an upstanding portion surrounding and overlapping said depending flange; and means affixed to said closure member for engaging the article.

13. A device for containing and exhibiting an article comprising a water-filled inverted glass bowl having an opening at the bottom thereof and a depending flange surrounding said opening, a disk-shaped closure for said flanged opening, and a base member composed of a hollowed out block engaging and supporting said bowl at points external to said flanged opening.

14. A device for containing and exhibiting flowers comprising a water-filled transparent container having an opening at the bottom thereof, a closure member for said opening composed of soft elastic rubber bearing an upstanding flange overlapping the bottom of said container, and flower stem engaging means associated therewith.

ROBERT W. SIMPSON.